(12) United States Patent
Matsumoto et al.

(10) Patent No.: US 7,824,047 B2
(45) Date of Patent: Nov. 2, 2010

(54) MOBILE TERMINAL DEVICE

(75) Inventors: Yoshiya Matsumoto, Kawasaki (JP); Shigeru Yamaguchi, Kawasaki (JP); Manabu Sotodate, Kawasaki (JP); Ken Shoji, Kawasaki (JP); Hiroshi Kobayashi, Kawasaki (JP); Ryou Hattori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 12/318,523

(22) Filed: Dec. 30, 2008

(65) Prior Publication Data

US 2009/0267506 A1 Oct. 29, 2009

(30) Foreign Application Priority Data

Apr. 28, 2008 (JP) ............................. 2008-117852

(51) Int. Cl.
    *H04M 1/22* (2006.01)
(52) U.S. Cl. .................. 362/24; 362/23; 362/29; 362/616
(58) Field of Classification Search ............ 362/23, 362/26, 29, 612, 613, 616, 633, 634, 555, 362/511, 97.3, 249.02, 249.1, 24, 85; 257/88, 257/89; 116/54, 202; 379/368; 345/169–170; 181/138
    See application file for complete search history.

(56) References Cited

U.S. PATENT DOCUMENTS

| | | | |
|---|---|---|---|
| 4,850,666 A * | 7/1989 | Izutsu et al. ................ 385/132 |
| 5,438,484 A * | 8/1995 | Kanda et al. ............... 362/613 |
| 6,046,730 A * | 4/2000 | Bowen et al. .............. 345/168 |
| 2001/0050988 A1 * | 12/2001 | Poulsen ................. 379/433.04 |
| 2003/0063456 A1 * | 4/2003 | Katahira ...................... 362/27 |
| 2003/0099116 A1 * | 5/2003 | Nousiainen ................ 362/559 |
| 2003/0112390 A1 * | 6/2003 | Alakontiola ............... 349/113 |
| 2006/0187676 A1 * | 8/2006 | Ishikura ..................... 362/615 |

FOREIGN PATENT DOCUMENTS

JP          6-318897          11/1994

* cited by examiner

*Primary Examiner*—Sandra L O'Shea
*Assistant Examiner*—Danielle Allen
(74) *Attorney, Agent, or Firm*—Staas & Halsey LLP

(57) ABSTRACT

In a cellular phone, a light guiding plate, which linearly guides light emitted by a plurality of light emitting elements (LEDs), and an LED display unit, which displays predetermined LED displays, are laminatedly arranged in a movable-side housing. A slit formed in the substantially central portion of the light guiding plate partitions the light guiding plate into a first light guiding region and a second light guiding region. A first light emitting group of the light emitting elements emits light to the first light guiding region and a second light emitting group of the light emitting elements emits light to the second light guiding region. The first light guiding region and the second light guiding region are illuminated alternately by alternately switching ON the first light emitting group and the second light emitting group.

9 Claims, 8 Drawing Sheets

REAR PANEL
350

351

353

REAR PANEL
350

352

351

MOBILE TERMINAL DEVICE

CROSS-REFERENCE TO RELATED APPLICATIONS

This application is based upon and claims the benefit of priority of the prior Japanese Patent Application No. 2008-117852, filed on Apr. 28, 2008, the entire contents of which are incorporated herein by reference.

BACKGROUND

1. Field

The present invention relates to a mobile terminal device that includes a movable-side housing on which a light guiding plate is disposed and particularly relates to a mobile terminal device in which a single light guiding plate enables fractionated illumination.

2. Description of the Related Art

In some of the typical cellular phones, a light guiding plate is disposed in a rear panel to temporarily illuminate the rear panel when a call is received or during conversation. Thus, temporary illumination of the rear panel when a call is received or during conversation facilitates in enhancing visual operability for the user or in producing illumination effects (e.g., see Japanese Patent Application Laid-open No. H06-318897).

However, in a cellular phone that includes a light guiding plate used to temporarily illuminate a rear panel, the light guiding plate is typically illuminated in entirety. Thus, to produce an illuminating effect such as illuminating two different places on the rear panel, it is necessary to use two light guiding plates. Consequently, the number of light emitting elements (LEDs) arranged in the light guiding plates increases thereby increasing the manufacturing cost.

Moreover, in recent years, the trend is to manufacture slim cellular phones. However, by disposing a plurality of light guiding plates each including a plurality of light emitting elements (LEDs), the thickness of a cellular phone increases and it becomes difficult to downsize the cellular phone.

SUMMARY

It is an object of the present invention to at least partially solve the problems in the conventional technology.

According to an aspect of an embodiment, a mobile terminal device includes a movable-side housing, a stationary-side housing, and a coupling hinge unit that couples the movable-side housing to the stationary-side housing. The movable-side housing includes a display panel, a light guiding plate that linearly guides light emitted by a plurality of light emitting elements, and an LED display unit that displays predetermined LED displays. The light guiding plate and the LED display unit are laminatedly arranged. The light guiding plate is partitioned into a first light guiding region and a second light guiding region having substantially identical dimensions by a slit formed in a substantially central portion of the light guiding plate, and the light emitting elements are configured to be divided into a first light emitting group and a second light emitting group. The first light emitting group and the second light emitting group are switched ON alternately.

According to another aspect of an embodiment, a mobile terminal device includes a movable-side housing, a stationary-side housing, and a coupling hinge unit that couples the movable-side housing to the stationary-side housing. The movable-side housing includes a display panel, a light guiding plate that linearly guides light emitted by a plurality of light emitting elements, and an LED display unit that displays predetermined LED displays. The light guiding plate and the LED display unit are laminatedly arranged. The light guiding plate is partitioned into a first light guiding region and a second light guiding region having substantially identical dimensions by a slit formed in a substantially central portion of the light guiding plate. The light emitting elements are configured to be divided into a first light emitting group and a second light emitting group that are switched ON in either one of an alternate manner and a simultaneous manner. The first light emitting group emits light to the first light guiding region, the second light emitting group emits light to the second light guiding region, and the first light emitting group and the second light emitting group are switched ON in either one of an alternate manner and a simultaneous manner.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

An exemplary embodiment of the present invention is described in detail below with reference to the accompanying drawings. In the exemplary embodiment, description is given for a cellular phone as a mobile terminal device. The present invention is not limited to the exemplary embodiment.

Figure 1:
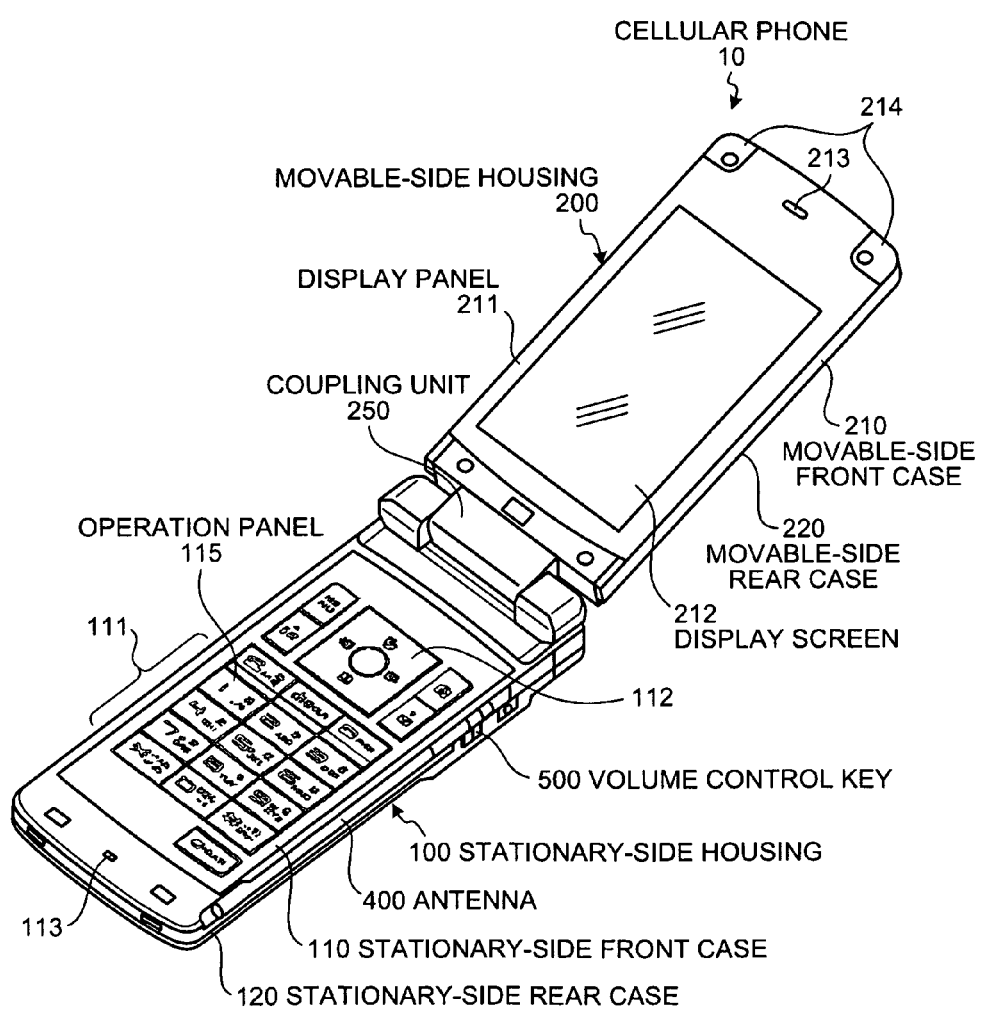
FIG. 1 is an external perspective view of a cellular phone in an open state according to an embodiment.

Given below is the description of an exemplary configuration of a cellular phone 10 with reference to FIG. 1. FIG. 1 is an external perspective view of the cellular phone 10 in an open state according to a first embodiment of the present invention. The cellular phone 10 includes a palm-size stationary-side housing 100 and a movable-side housing 200. The stationary-side housing 100 and the movable-side housing 200 are coupled by a coupling unit 250 that has a hinge structure.

More particularly, in the cellular phone 10 shown in FIG. 1, the stationary-side housing 100 is used to talk during a telephone call and has a plurality of operating keys such as a numerical keypad 111 with number keys (from 0 to 9) and a function key 112 (mode setting key). The movable-side housing 200 is fabricated to have a substantially identical size to that of the stationary-side housing 100 and includes an LCD module (not shown). The coupling unit 250 couples the movable-side housing 200 to the stationary-side housing 100 in a foldable manner.

The stationary-side housing 100 and the movable-side housing 200 are fabricated in a box shape from, although not limited to, a lightweight and high-strength magnesium alloy.

The stationary-side housing 100 is a two-fraction structure of a stationary-side front case 110 on the front side and a stationary-side rear case 120 on the rear side (the downside in FIG. 1). The stationary-side front case 110 includes an operation panel 115 in which the operation keys such as the numerical keypad 111 and the like are arranged.

More particularly, as shown in FIG. 1, the stationary-side front case 110 includes the numerical keypad 111, the function key 112, and a mouthpiece 113 that converts voice of the user into electric signals. The stationary-side front case 110 and the stationary-side rear case 120 are clamped at four positions by using spanning screws (not shown).

An external foldable antenna 400 and a volume control key 500 (side key), which is used to control volume of radio transmission and the like, are arranged on a lateral side of the stationary-side front case 110.

The movable-side housing 200 is a two-fraction structure of a movable-side front case 210 on the front side and a movable-side rear case 220 on the rear side (downside in FIG. 1). As shown in FIG. 1, a large-size display panel 211 and a large-size display screen 212 are arranged in the substantially central portion of the movable-side front case 210. The display panel 211 and the display screen 212 are used for viewing the display output by an LCD module 224 (see FIG. 2).

An earpiece 213 is disposed in the top portion of the movable-side front case 210. The earpiece 213 catches the voice of the person on the other end of the line during a conversation. The movable-side front case 210 and the movable-side rear case 220 are clamped at four positions by using spanning screws (not shown). The spanning screws in the top portion of the display panel 211 are covered by screw covers 214.

Figure 2:
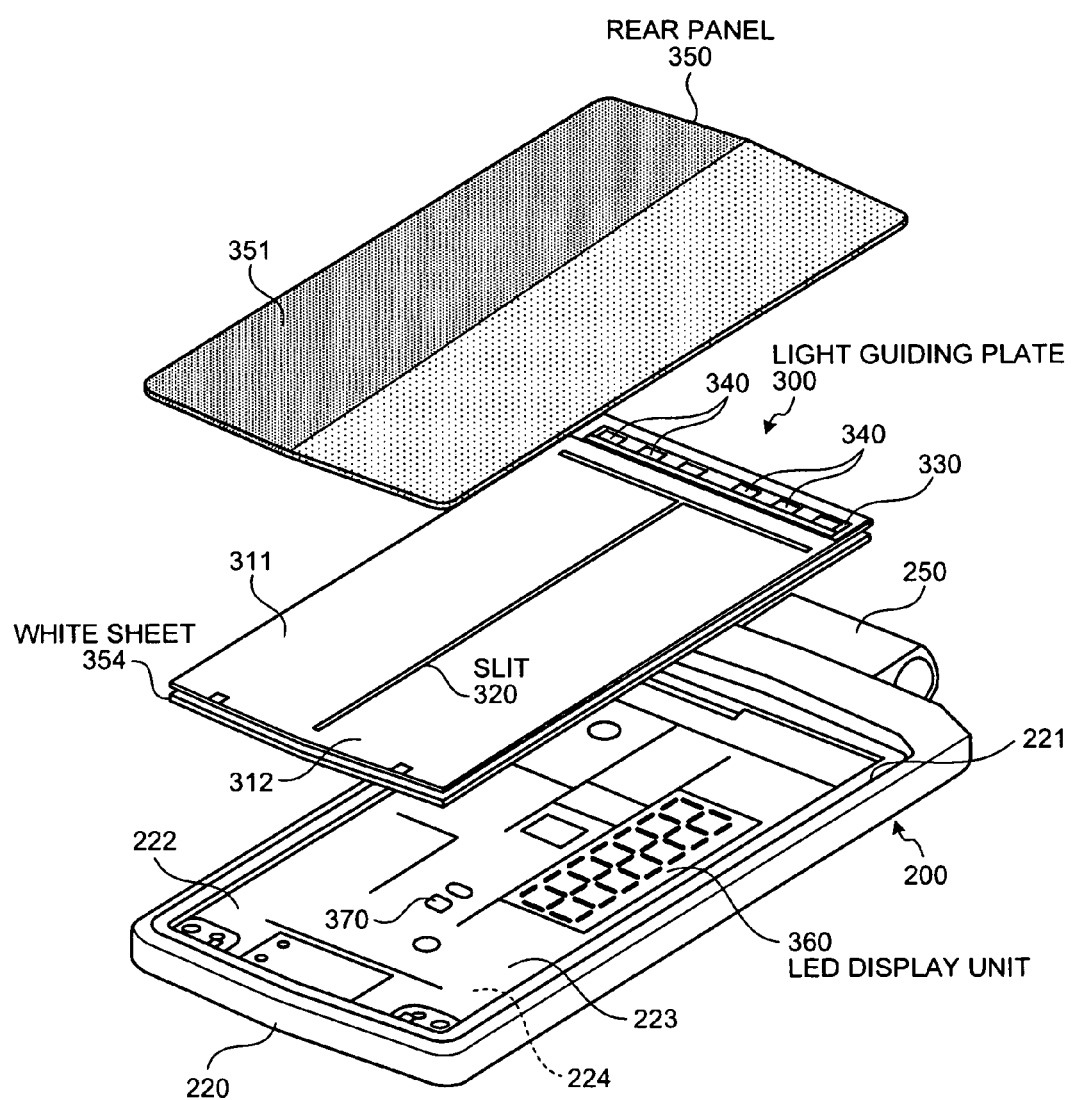
FIG. 2 is an exploded perspective view of a rear panel and a light guiding plate in the cellular phone.
Figure 3:
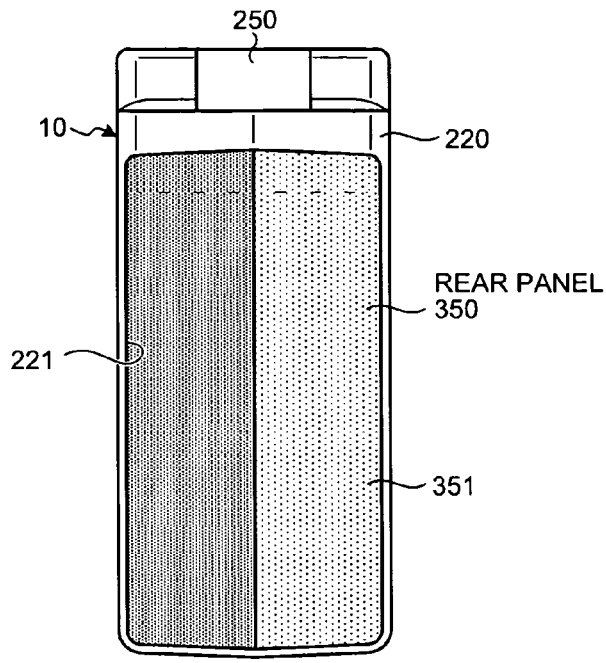
FIG. 3 is a top view of the cellular phone shown in FIG. 1.
Figure 4:
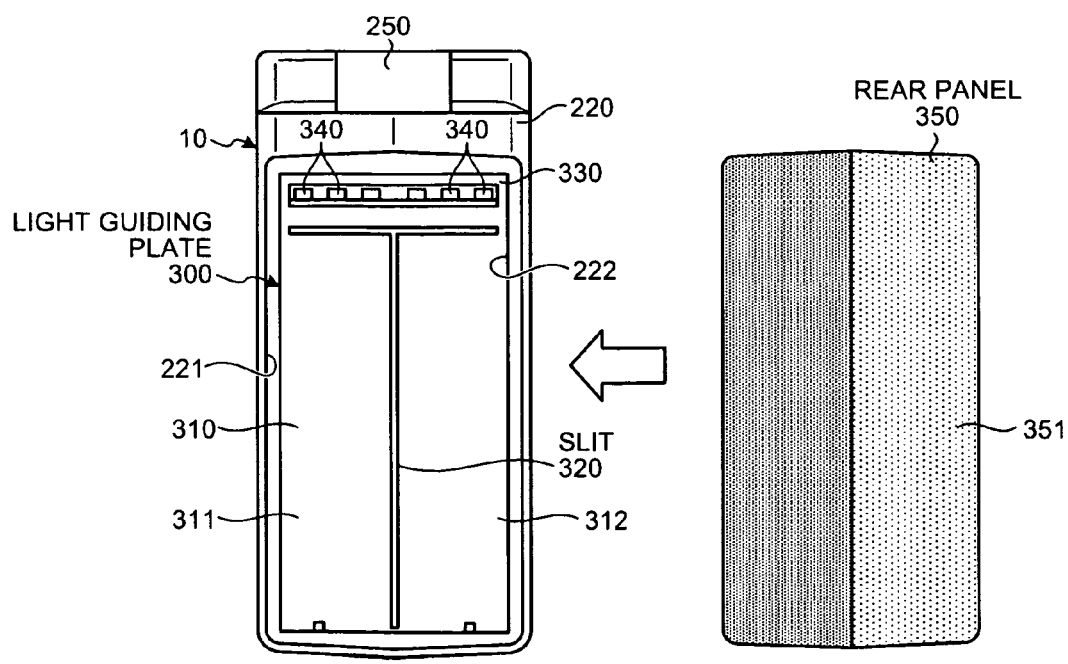
FIG. 4 is a plane view of the rear panel and the light guiding plate of the cellular phone.
Figure 5A:
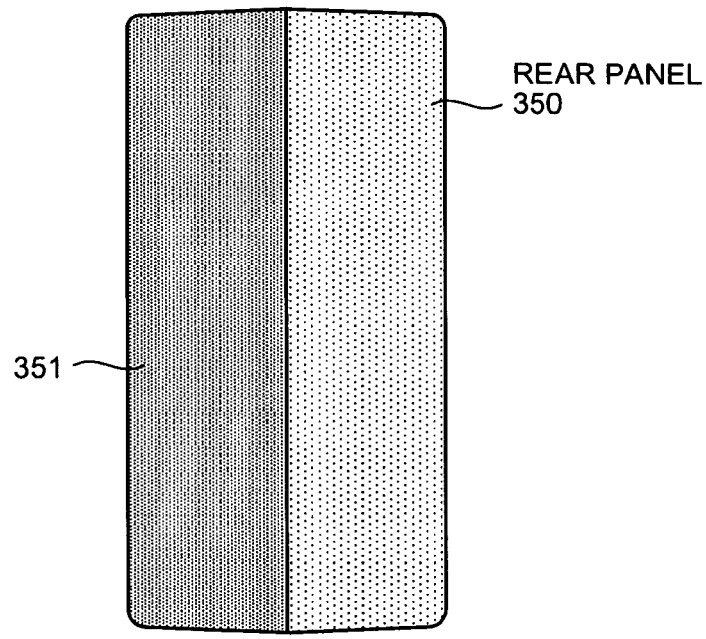
FIG. 5A is a front view of the rear panel.
Figure 5B:
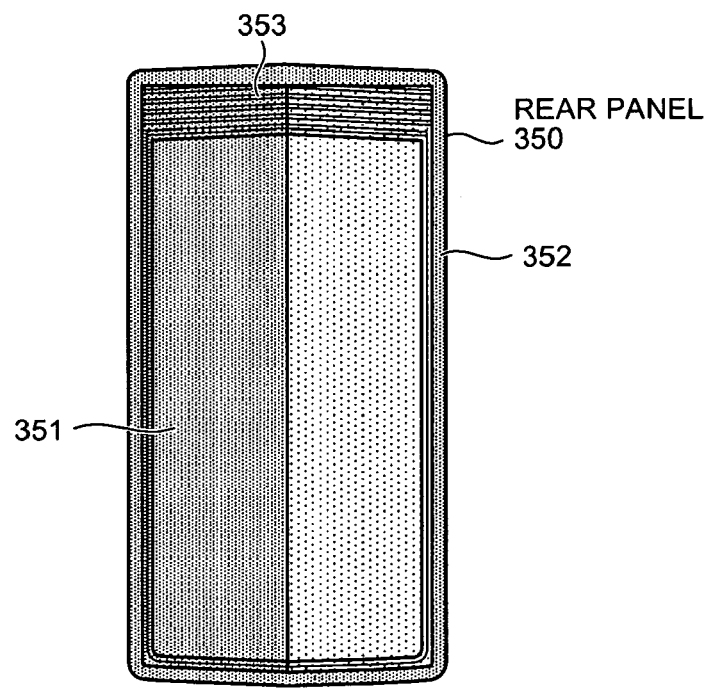
FIG. 5B is a rear view of the rear panel.
Figure 6:
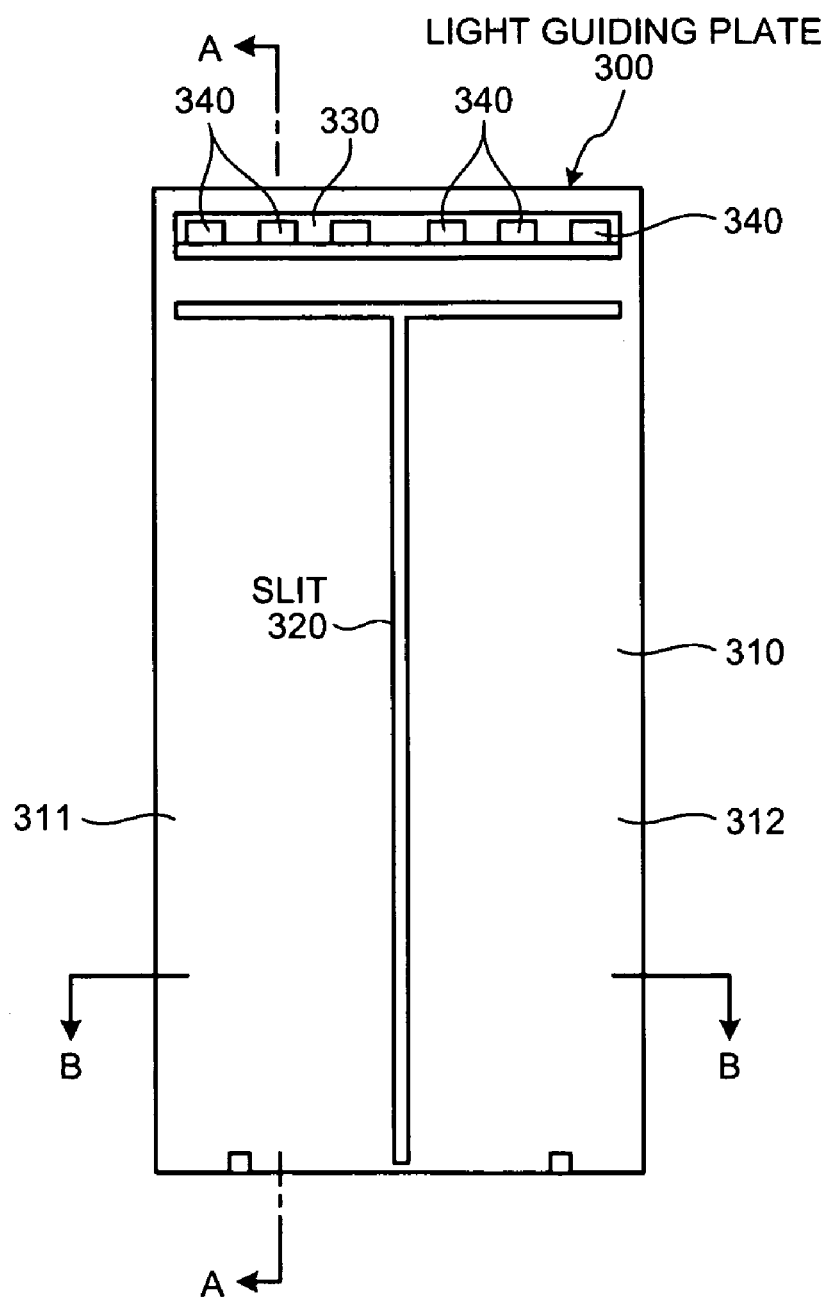
FIG. 6 is a plan view of the light guiding plate.
Figure 7A:
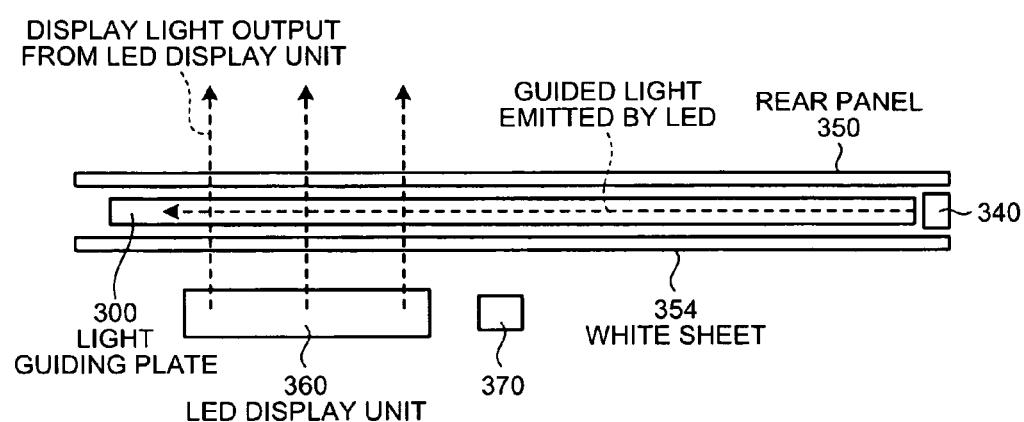
FIG. 7A is an A-A cross-sectional view of FIG. 6.
Figure 7B:
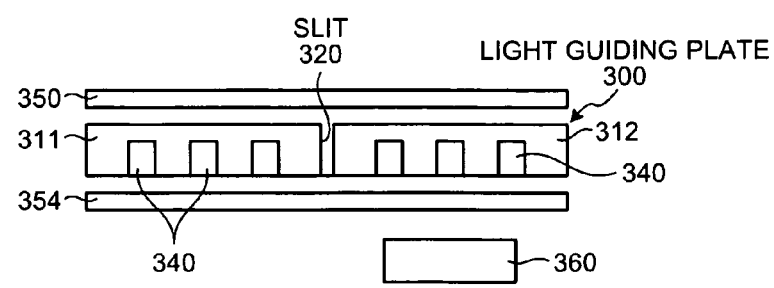
FIG. 7B is a B-B cross-sectional view of FIG. 6.

Given below is the description with reference to FIGS. 2 to 7 of an exemplary configuration and features of a light guiding plate 300 in the cellular phone 10. FIG. 2 is an exploded perspective view of a rear panel 350 and the light guiding plate 300 in the cellular phone 10. FIG. 3 is a top view of the cellular phone 10. FIG. 4 is a plane view of the rear panel 350 and the light guiding plate 300. FIG. 5A is a front view of the rear panel 350, while FIG. 5B is a rear view of the rear panel 350. FIG. 6 is a plan view of the light guiding plate 300. FIG. 7A is an A-A cross-sectional view of FIG. 6 and FIG. 7B is a B-B cross-sectional view of FIG. 6.

In the cellular phone 10 according to the first embodiment, the light guiding plate 300 and an LED display unit 360 are laminatedly arranged in the movable-side housing 200. The LED display unit 360 displays predetermined LED displays. The light guiding plate 300 linearly guides the light emitted by a plurality of LEDs 340, which are linear light sources. A slit 320 is formed in the substantially central portion of the light guiding plate 300 such that the light guiding plate 300 is partitioned into a first light guiding region 311 and a second light guiding region 312, which have substantially identical dimensions. The LEDs 340 are divided into a first light emitting group and a second light emitting group. The feature of the cellular phone 10 is that the LEDs 340 in the first light emitting group and the LEDs 340 in the second light emitting group can be alternately switched ON to alternately illuminate the first light guiding region 311 and the second light guiding region 312.

As shown in FIGS. 2 to 6, in the movable-side rear case 220, a partition plate 223 is disposed to partition the LCD module 224 from the laminated structure of a rear panel 350 and the light guiding plate 300. More particularly, the LED display unit 360, which displays liquid crystal display of, e.g., time or various designs, and an incoming LED 370, which emits light when a call is received, are arranged on one side of the LCD module 224 (right side in FIG. 2).

As shown in FIG. 2, the movable-side rear case 220 has a rectangular recess 222 in which the light guiding plate 300 can fit, and a groove 221 that is formed on the outside of the rectangular recess 222 with a substantially identical shape to that of the rear panel 350. First, the light guiding plate 300 is maintained fixed into the rectangular recess 222 and then the rear panel 350 is fixed into the groove 221.

The light guiding plate 300 is fabricated from a rectangular light guiding main frame 310 made of, although not limited to, an acrylic plate. The size and shape of the light guiding main frame 310 is substantially identical to that of the rectangular recess 222. As described above, because of the slit 320 formed in the substantially central portion of the light guiding main frame 310, the light guiding plate 300 is partitioned into the first light guiding region 311 and the second light guiding region 312, which have substantially identical dimensions.

A linear light source area 330 is formed on the top portion of the light guiding main frame 310. A plurality of LEDs 340 (six LEDs 340 in FIGS. 2, 4, and 6) is arranged in the linear light source area 330. The six LEDs 340 are divided into two light emitting groups, namely, a first light emitting group of the first three LEDs 340 and a second light emitting group of the remaining three LEDs 340. The first light guiding region 311 can linearly guide the light emitted by the LEDs 340 in the first light emitting group, while the second light guiding region 312 can linearly guide the light emitted by the LEDs 340 in the second light emitting group.

Thus, because of the slit 320 in the light guiding plate 300, the light transmitted to the light guiding plate 300 is blocked in such a way that it is possible to fractionate the light guiding region on the light guiding plate 300. Thus, based on the light guiding plate 300 and the combination of switching ON and switching OFF the LEDs 340 in the first light emitting group and the LEDs 340 in the second light emitting group, it is possible to achieve intermittent or continuous fractionated illumination or illumination in entirety.

More particularly, to illuminate the light guiding plate 300 in entirety, the LEDs 340 in the first light emitting group as well as in the second light emitting group are switched ON simultaneously. On the other hand, to partially illuminate the light guiding plate 300, the LEDs 340 in either one of the first light emitting group and the second light emitting group are switched ON or switched OFF. Such a configuration enables illumination of the rear panel 350 in entirety or partially with the use of only a single light guiding plate 300.

A white sheet 354 having low optical opacity (see FIG. 2) is fixedly attached to the rear side of the light guiding plate 300. The white sheet 354 functions as a reflecting sheet for preventing light attenuation of the light coming from the first light guiding region 311 and the second light guiding region 312.

Moreover, because the white sheet 354 is arranged between the light guiding plate 300 and the LED display unit 360, the light from the LED display unit 360 that enters into the light guiding plate 300 from the rear side penetrates through the light guiding plate 300 (see FIG. 7A). That results in an illumination effect due to overlapping of light.

In this way, because of the white sheet 354, the light guiding plate 300 is also able to guide the light output from the LED display unit 360, which is arranged beneath the light guiding plate 300.

The rear panel 350 is fabricated to have a substantially identical size and shape to that of the light guiding plate 300. A light shielding frame 352 of black color is attached around the rear surface of a main panel body 351 of the rear panel 350 and a light shielding rim 353 is impacted around the light shielding frame 352 (see FIG. 5B). Because of the light shielding frame 352 and the light shielding rim 353, the intensity of light output from the edges of the rear panel 350 is controlled in addition to light shielding.

Figure 8:
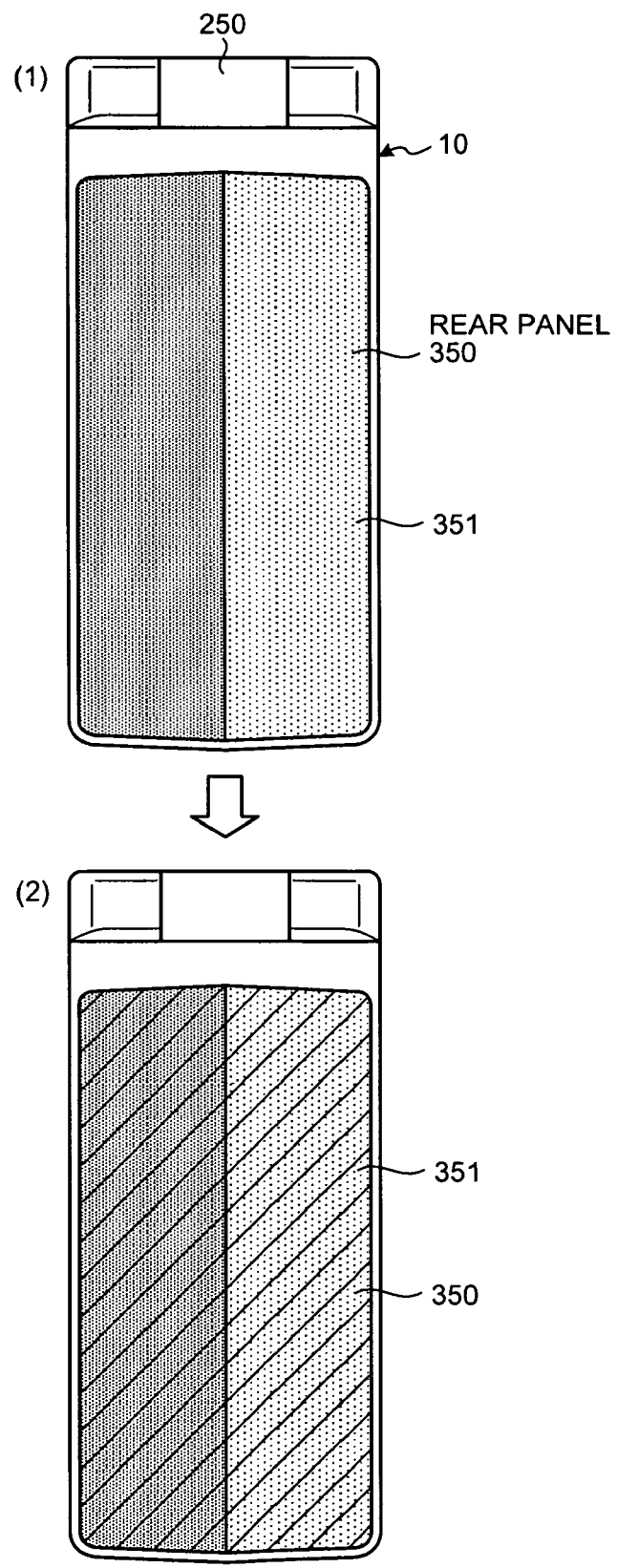
FIG. 8 is an explanatory diagram of illumination of the rear panel (illumination in entirety) by the light guiding plate.
Figure 9:
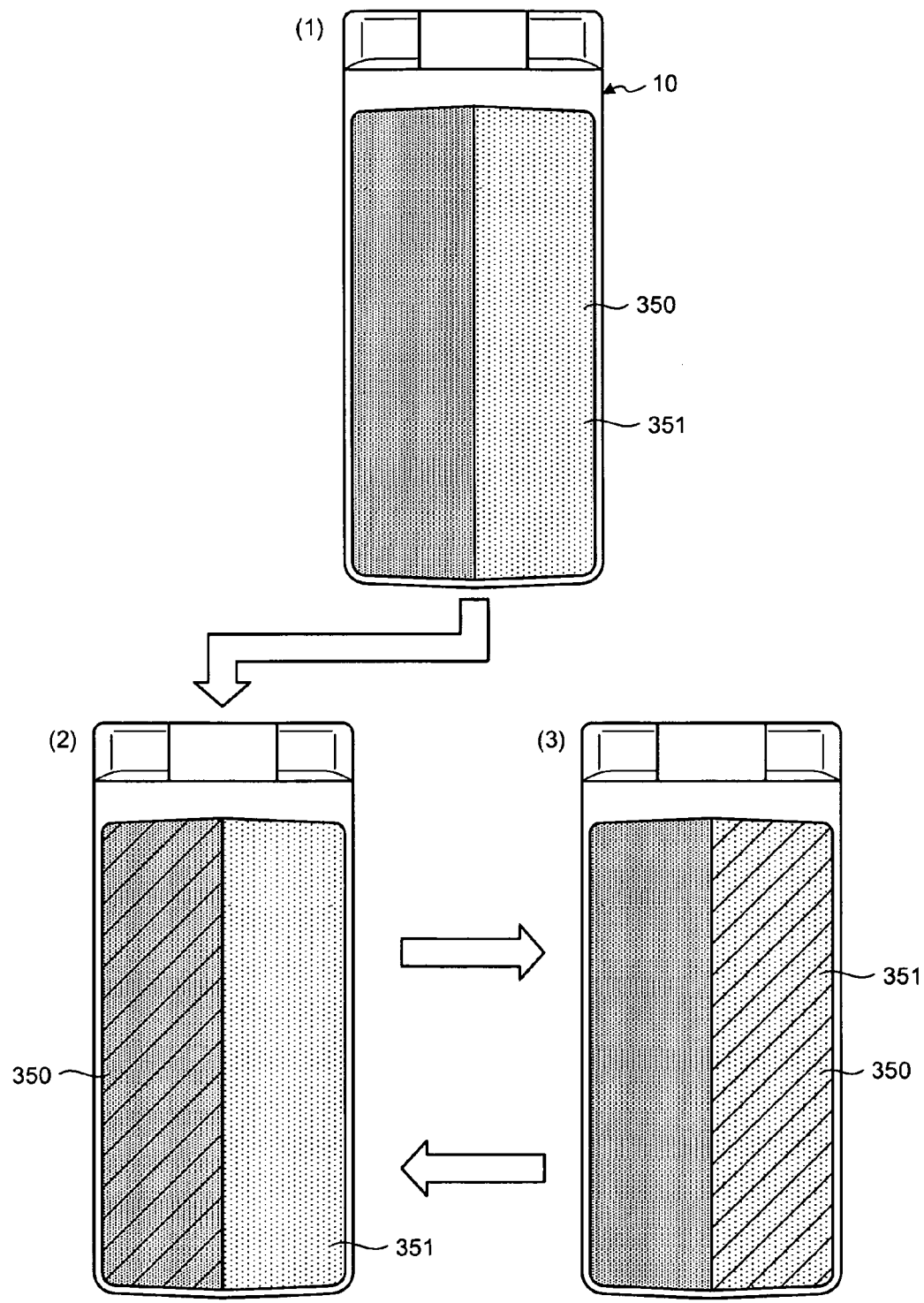
FIG. 9 is an explanatory diagram of illumination of the rear panel (fractionated illumination) by the light guiding plate.

FIG. 8 is an explanatory diagram of illumination of the rear panel 350 (illumination in entirety) because of the light guiding plate 300. FIG. 9 is an explanatory diagram of illumination of the rear panel 350 (fractionated illumination) because of the light guiding plate 300. In FIGS. 8 and 9, the region with diagonal lines indicates the illuminated region of the rear panel 350 that is illuminated due to the light guided by either one or both of the first light guiding region 311 and the second light guiding region 312 (see FIG. 6).

As shown in FIGS. 8 and 9, the light guiding plate 300 is partitioned into the first light guiding region 311 and the second light guiding region 312 with the use of the slit 320. The LEDs 340 in the first light emitting group are arranged to correspond to the first light guiding region 311. The LEDs 340 in the second light emitting group are arranged to correspond to the second light guiding region 312. In FIG. 8, a condition (1) indicates that the LEDs 340 in the first light emitting group as well as in the second light emitting group are switched OFF. Thus, the rear panel 350 is not shown in an illuminated state. A condition (2) indicates that the LEDs 340 in the first light emitting group as well as in the second light emitting group are switched ON. Thus, the rear panel 350 is shown to be illuminated in entirety.

Similarly, in FIG. 9, a condition (1) indicates that the LEDs 340 in the first light emitting group as well as in the second light emitting group are switched OFF. A condition (2) indicates that the LEDs 340 in only the first light emitting group are switched ON. Thus, only the left region of the rear panel 350 is shown to be illuminated. A condition (3) indicates that the LEDs 340 in only the second light emitting group are switched ON. Thus, only the right region of the rear panel 350 is shown to be illuminated. In this way, by alternately switching ON the LEDs 340 in the first light emitting group and the LEDs 340 in the second light emitting group, it is possible to alternately illuminate the left region and the right region of the rear panel 350.

Thus, by intermittently and alternatively carrying out the illumination in entirety of the rear panel 350 shown in conditions (1) and (2) in FIG. 8 and the fractionated illumination of the rear panel 350 shown in conditions (1), (2) and (3) in FIG. 9, it is possible to produce various illumination effects.

Moreover, when the LED display unit 360 in the LCD module 224 is switched ON, the LED display of time or design in the LED display unit 360 that penetrates through the light guiding plate 300 and the illumination of the first light guiding region 311 and the second light guiding region 312 can be combined to efficiently produce illumination effects.

To sum up, in the cellular phone 10 according to the first embodiment, the light guiding plate 300 linearly guides the light emitted a plurality of light sources (i.e., the LEDs 340). The light guiding plate 300 and the LED display unit 360, which displays predetermined LED displays, are laminatedly arranged in the movable-side housing 200. Because of the slit 320 formed in the substantially central portion of the light guiding plate 300, the light guiding plate 300 is partitioned into the first light guiding region 311 and the second light guiding region 312. By alternately switching ON the LEDs 340 in the first light emitting group and the LEDs 340 in the second light emitting group, it is possible to alternately illuminate the first light guiding region 311 and the second light guiding region 312. In this way, without having to arrange a plurality of the light guiding plates 300, a single light guiding plate 300 can be used to achieve fractionated illumination and efficiently produce illumination effects.

Meanwhile, although the above description is given for a folding cellular phone in which a hinge structure shown in FIG. 1 is used for coupling a movable-side housing to a stationary-side housing, it is also possible to use a hinge structure other than that shown in FIG. 1. Moreover, instead of a folding cellular phone, the above description can also be implemented for a cellular phone in which the movable-side housing is overlappably coupled to the stationary-side housing with the use of a coupling unit having a sliding structure or a rotating structure.

The mobile terminal device in the first embodiment is assumed to be a cellular phone. However, the above description can also be implemented as a light emitting configuration for a luminescent panel in a small-size information processing device such as a personal digital assistant (PDA), or a small-size music player, or a portable television, or a hand-held gaming device.

In this way, according to the embodiments, a mobile terminal device includes a light guiding plate that is partitioned into a first light guiding region and a second light guiding region with the use of a slit. To illuminate the light guiding plate in entirety, light emitting elements (LEDs) in the first light guiding region as well as in the second light guiding region are switched ON simultaneously. On the other hand, to partially illuminate the light guiding plate, the light emitting elements (LEDs) in either one of the first light guiding region and the second light guiding region are switched ON. Such a configuration enables fractionated illumination with respect to a rear panel by using a single light guiding plate. That leads to a decrease in the number of components, simplification in the configuration of the mobile terminal device, and reduction in the manufacturing cost.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A mobile terminal device comprising:
    a movable-side housing that includes
        a display panel,
        a light guiding plate that linearly guides light emitted by a plurality of light emitting elements, and
        an LED display unit that displays predetermined LED displays, the light guiding plate and the LED display unit being laminatedly arranged;
    a stationary-side housing; and a coupling hinge unit that couples the movable-side housing to the stationary-side housing, wherein
the light guiding plate is partitioned into a first light guiding region and a second light guiding region having substantially identical dimensions by a slit formed in a substantially central portion of the light guiding plate, and
the light emitting elements are configured to be divided into a first light emitting group and a second light emitting group, the first light emitting group and the second light emitting group being switched ON alternately.

2. The mobile terminal device according to claim 1, wherein
each of the first light guiding region and the second light guiding region is illuminated in entirety by simultaneously switching ON the first light emitting group and the second light emitting group, and
the first light guiding region and the second light guiding region are illuminated alternately by alternately switching ON the first light emitting group and the second light emitting group.

3. The mobile terminal device according to claim 1, further comprising a white sheet having low optical opacity and disposed in between the light guiding plate including the first light guiding region and the second light guiding region and the LED display unit, the white sheet transmitting display light output from the LED display unit.

4. The mobile terminal device according to claim 1, wherein a direction of the light guided by the first light guiding region and the second light guiding region intersects with a direction of display light output from the LED display unit at a substantially right angle.

5. A mobile terminal device comprising:
a movable-side housing that includes
a display panel,
a light guiding plate that linearly guides light emitted by a plurality of light emitting elements, and
an LED display unit that displays predetermined LED displays, the light guiding plate and the LED display unit being laminatedly arranged;
a stationary-side housing; and
a coupling hinge unit that couples the movable-side housing to the stationary-side housing, wherein
the light guiding plate is partitioned into a first light guiding region and a second light guiding region having substantially identical dimensions by a slit formed in a substantially central portion of the light guiding plate,
the light emitting elements are configured to be divided into a first light emitting group and a second light emitting group that are switched ON in either one of an alternate manner and a simultaneous manner, and
the first light emitting group emits light to the first light guiding region, the second light emitting group emits light to the second light guiding region, and the first light emitting group and the second light emitting group are switched ON in either one of an alternate manner and a simultaneous manner.

6. The mobile terminal device according to claim 5, further comprising a sheet member having low optical opacity and disposed in between the light guiding plate including the first light guiding region and the second light guiding region and the LED display unit, the sheet member transmitting display light output from the LED display unit.

7. The mobile terminal device according to claim 5, further comprising a white sheet having low optical opacity and disposed in between the light guiding plate including the first light guiding region and the second light guiding region and the LED display unit, the white sheet transmitting display light output from the LED display unit.

8. The mobile terminal device according to claim 5, further comprising a white sheet having low optical opacity and disposed in between the light guiding plate including the first light guiding region and the second light guiding region and the LED display unit, the white sheet reflecting the light emitted by the first light emitting group and the second light emitting group, and transmitting display light output from the LED display unit.

9. The mobile terminal device according to claim 5, wherein direction of the light guided by the first light guiding region and the second light guiding region intersects with direction of display light output from the LED display unit at a substantially right angle.

* * * * *